April 7, 1953    J. E. MORROW ET AL    2,633,913
CONTROL DEVICE
Filed Jan. 3, 1950    8 Sheets-Sheet 1

Inventors
James E. Morrow and
Marion T. Edwards
By Eugene D. Farley
Atty.

Inventors
James E. Morrow and
Marion T. Edwards
By Eugene D. Farley
Atty.

April 7, 1953     J. E. MORROW ET AL     2,633,913
CONTROL DEVICE
Filed Jan. 3, 1950     8 Sheets-Sheet 3
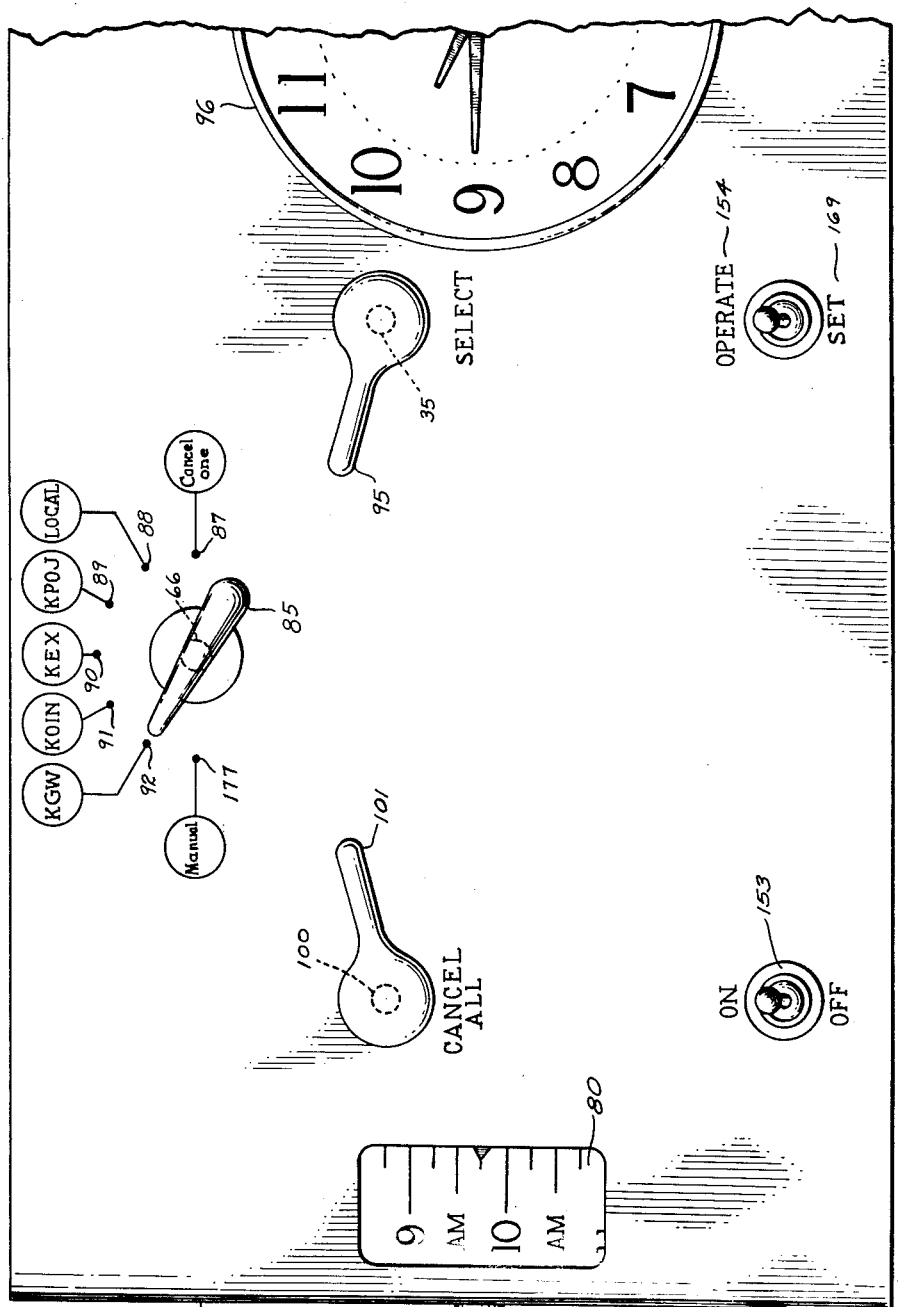
Fig. 3.
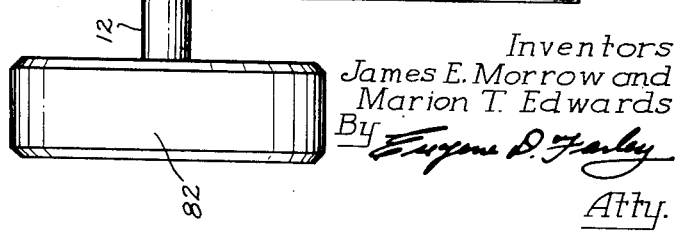
Inventors
James E. Morrow and
Marion T. Edwards
By Eugene D. Farley
Atty.

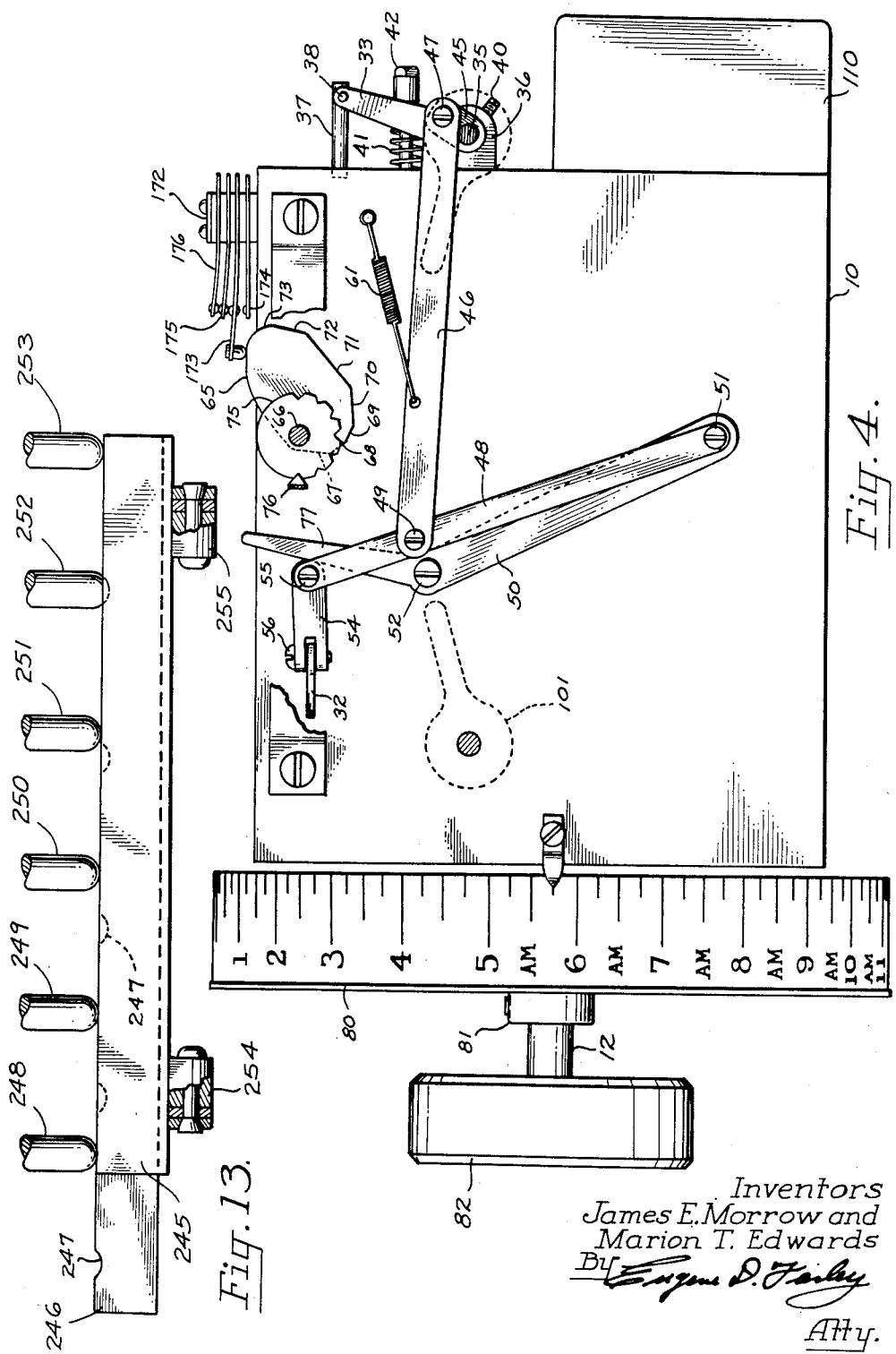

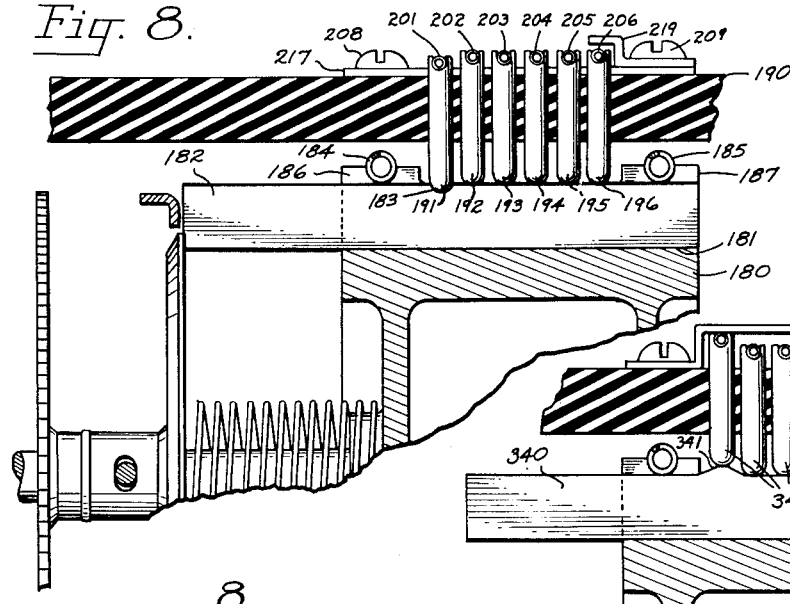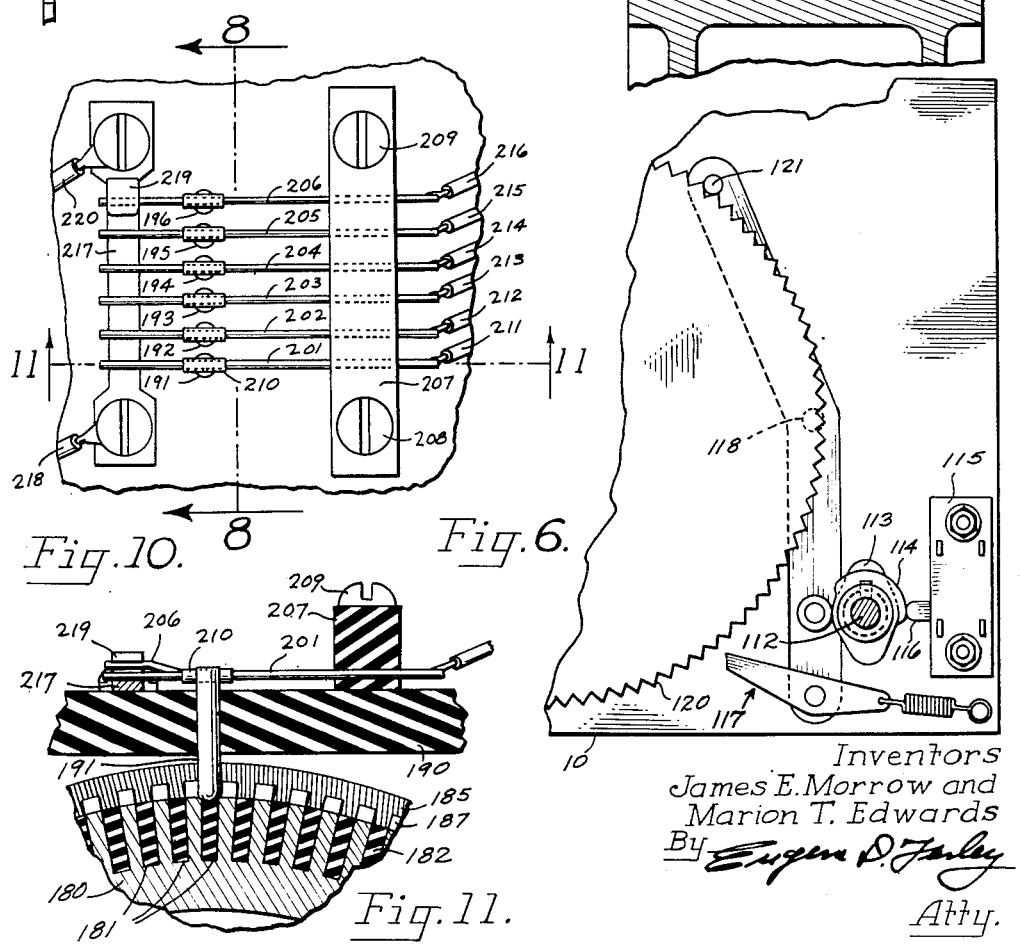

April 7, 1953  J. E. MORROW ET AL  2,633,913
CONTROL DEVICE
Filed Jan. 3, 1950  8 Sheets-Sheet 6

Inventors
James E. Morrow and
Marion T. Edwards
By Eugene D. Farley
Atty.

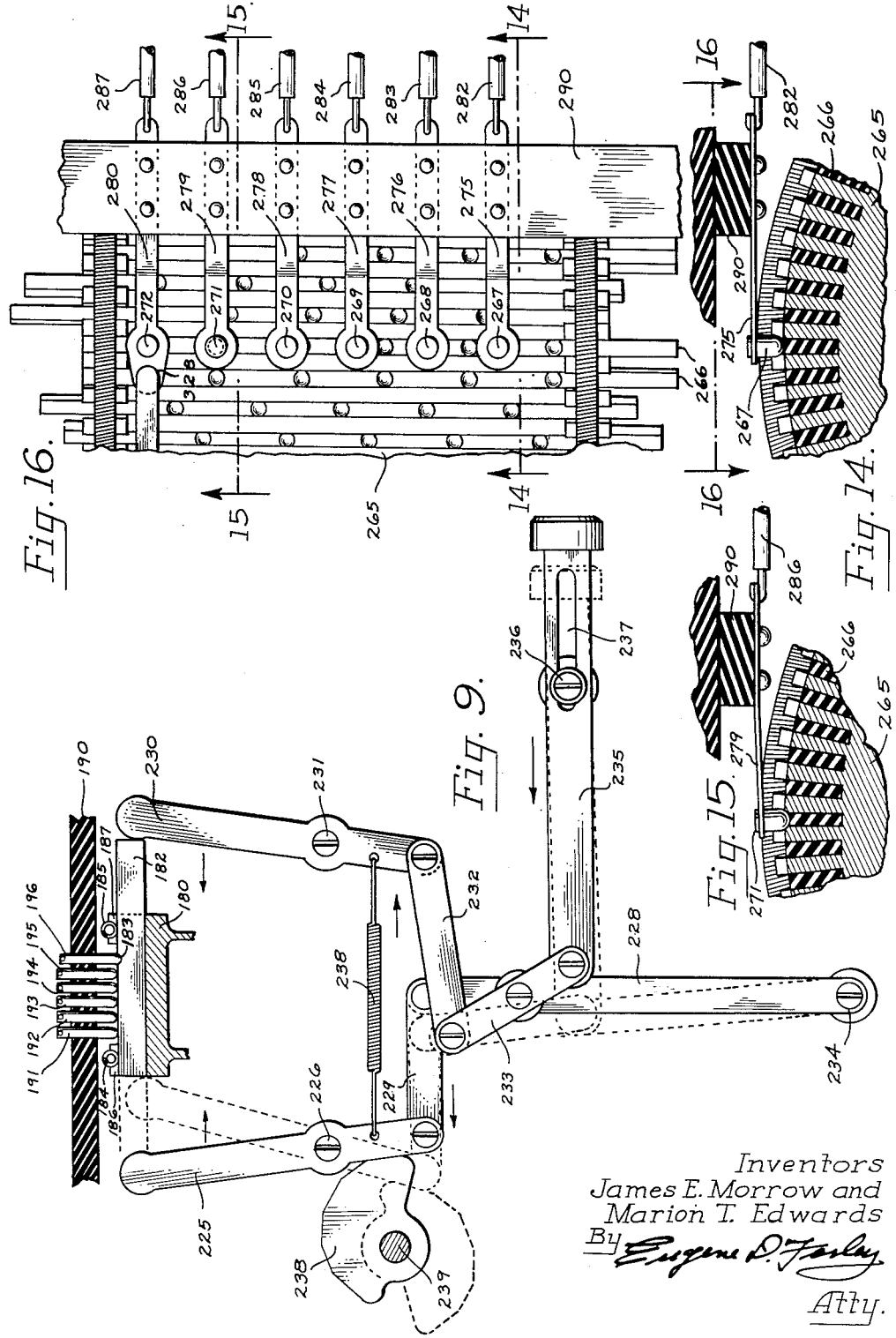

April 7, 1953        J. E. MORROW ET AL        2,633,913
CONTROL DEVICE
Filed Jan. 3, 1950                                     8 Sheets-Sheet 8
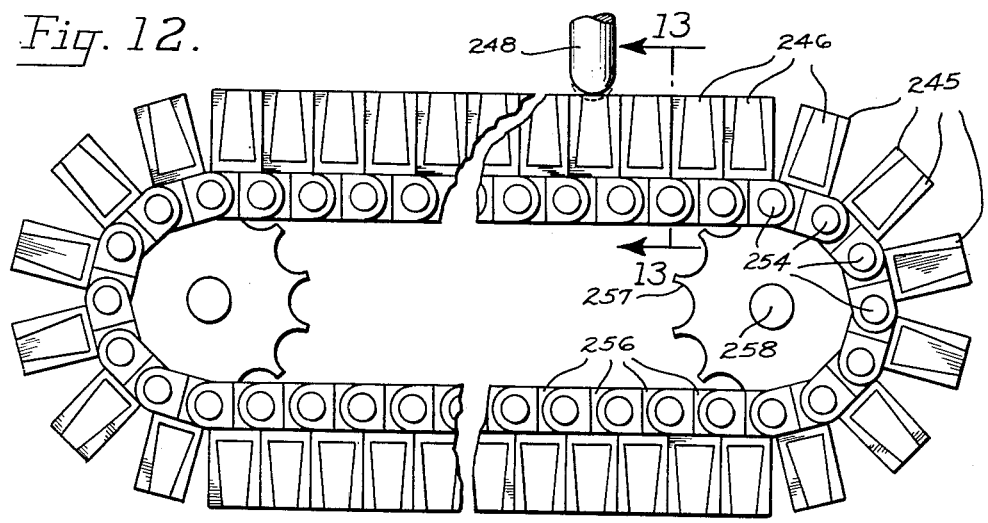
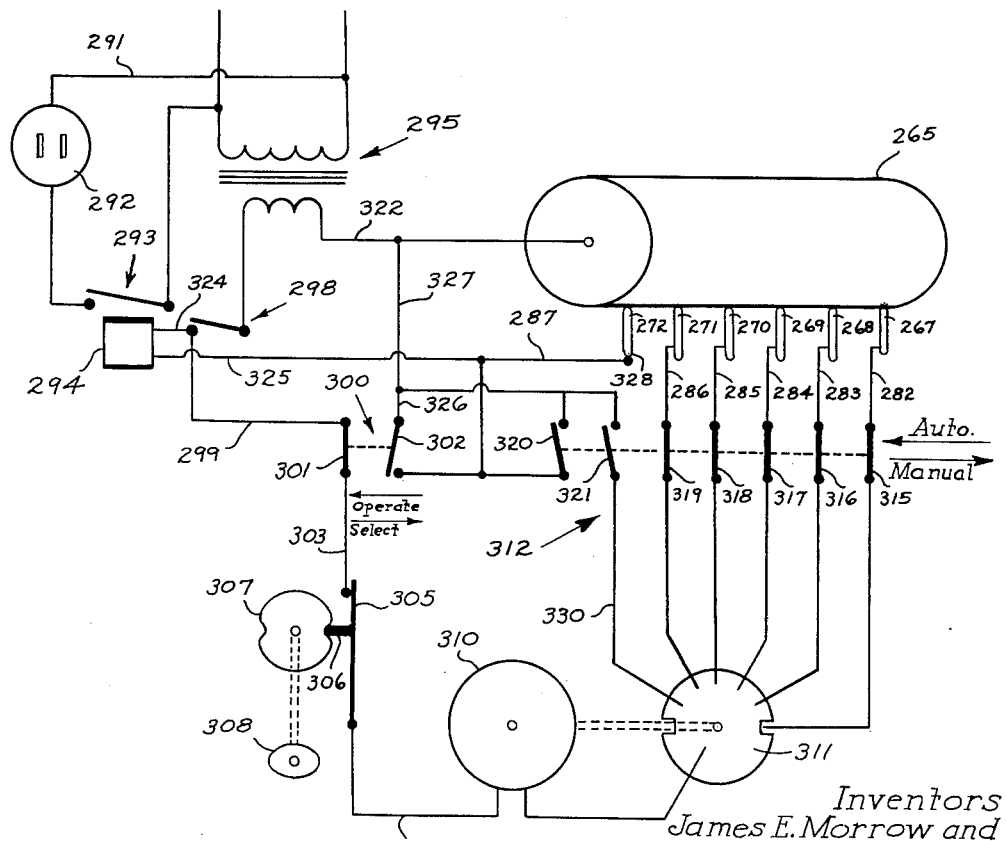
Inventors
James E. Morrow and
Marion T. Edwards
By Eugene D. Farley
Atty.

Patented Apr. 7, 1953

2,633,913

UNITED STATES PATENT OFFICE 2,633,913

CONTROL DEVICE

James E. Morrow and Marion T. Edwards,
Portland, Oreg.

Application January 3, 1950, Serial No. 136,438

7 Claims. (Cl. 161—1)

The present invention relates to a control device for controlling the operation of a responsive device in accordance with a preselected schedule.

The control device of the present invention is particularly applicable to the control of the tuning mechanism of a radio, being adapted to tune the radio at prescribed times so that preselected radio programs will be received. Although our invention is described herein with particular reference to this application, it also is adaptable to other applications such as the timing of devices other than radios, the control of one or more electric circuits, the operation of a plurality of electric signs or signals, and the like.

It is a primary object of our control device to provide means for selecting and actuating any one of a plurality of electric circuits at predetermined time intervals.

It is another object of our invention to control the operation of a radio set automatically so that preselected programs may be tuned in at selected intervals during the 24-hour day, the program schedule repeating itself automatically from day to day unless changed.

It is another object of our invention to provide a control device for actuating any one of a plurality of electric circuits at predetermined time intervals which may be set rapidly and easily to follow the desired schedule.

Still another object of our invention is the provision of a control device for actuating any one of several electric circuits at predetermined time intervals which may be set to follow a certain schedule while in operation, without disturbing the particular operation being performed. When the invention is applied to a radio, for example, the schedule of radio programs may be set up for the desired period while the radio is tuned to a selected station without interfering with the program being received.

It is another object of our invention to provide a control device for actuating any one of several electric circuits at predetermined time intervals according to a time schedule which may be adjusted rapidly and easily to change any one of the elements in the schedule without affecting the others. When the invention is applied to the opeartion of a radio, for example, any selected program on the schedule may be cancelled or changed without disturbing the rest of the schedule or affecting the operation of the radio while the change is being made.

It is still another object of our invention to provide a control device for actuating any one of several electric circuits at intervals according to a predetermined schedule in which device means are provided for cancelling simultaneously all of the control elements thereby permitting setting up a new schedule easily and rapidly.

Another object of our invention is the provision of a control device which will turn off the controlled mechanism as well as change its setting at any predetermined time interval. For example, when applied to a radio, the presently described device will turn off the radio automatically during the periods for which no program has been selected, and then will turn it on again automatically when it is desired to tune in a given program.

Still a further object of our invention is the provision of a control device which is simple in construction and operation, and which, when applied to the control of a radio, may be applied either in the construction of new radio units, or adapted for application to radio units already in use.

The manner in which the foregoing and other objects of our invention are accomplished will be apparent from the following specification and claims considered together with the accompanying drawings wherein:

Figure 3 is a view in elevation of the control panel indicating the elements used for setting and adjusting the device;

Figure 4 is a view in elevation of the control device of our invention with the front panel removed, illustrating particularly the means employed for operating the selecting mechanism;

Figure 6 is a view taken along the lines 6—6 of Fig. 1, and illustrating particularly the driving mechanism of our control device;

Figure 8 is a fragmentary view in section of an alternate construction of the selecting mechanism which may be used in the control device of our invention taken along lines 8—8 of Figure 10;

Figure 9 is a view in elevation illustrating means for operating the selecting mechanism of Figure 8;

Figure 10 is a plan view of the selecting mechanism of Figure 8;

Figure 11 is a sectional view taken along the lines 11—11 of Figure 10;

Figure 12 is a fragmentary, perspective view showing still another embodiment of a selecting mechanism which may be employed in the construction of our control device;

Figure 13 is a detail view of one of the elements comprising the embodiment of Figure 12, taken along the lines 13—13 of Fig. 12;

Figure 14 is a fragmentary sectional view illustrating still another embodiment of the selecting mechanism employed in the control device of our invention;

Figure 15 is a sectional view further illustrating the construction of the embodiment of Figure 14;

Figure 16 is a plan view still further illustrating the construction of the embodiment of Figure 14;

Figure 17 is a wiring diagram indicating the electric circuit employed in the operation of the embodiment of Figures 14, 15 and 16; and Figure 18 is a detail view of an alternate type of selecting element which may be used in the construction of our control device.

Figure 1:
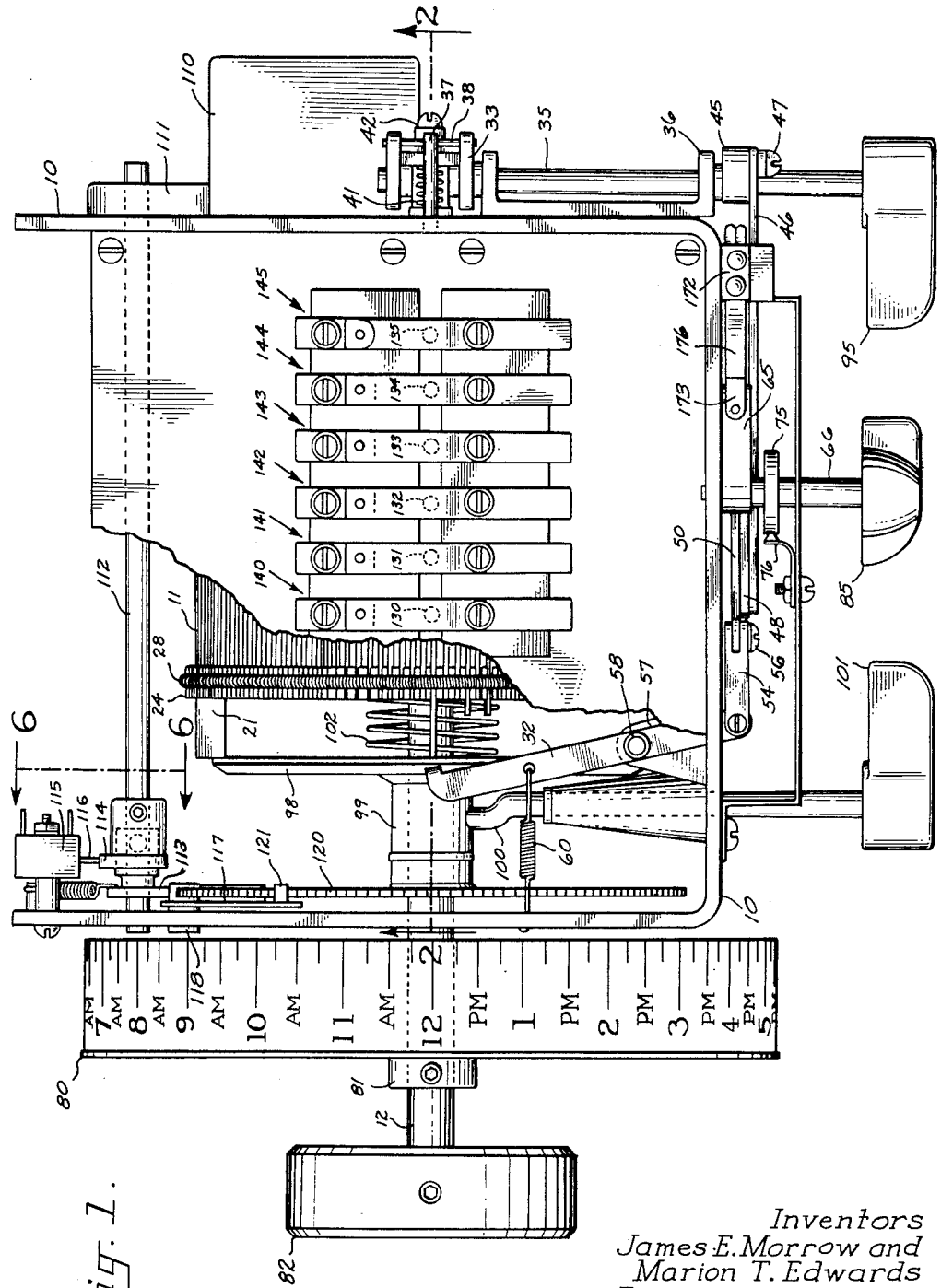
Figure 1 is a plan view of the control device of our invention, partly broken away better to show the construction.

Generally stated, the control device of the present invention comprises a central body member, preferably a drum, having in the surface thereof a plurality of guideways aligned with the axis of the drum. In each of the guideways is mounted slidably a key, this being an elongated member longer than the drum and projecting outwardly therefrom on one or both sides, depending upon its position. On the exposed surface of the key are one or more irregularities, which may be either depressions or projections.

The drum is mounted rotatably in a suitable framework so that the keys may be presented one at a time to a given station. At this station are positioned a plurality of electric contact units, each comprising a pair of contact points placed adjacent the drum. Between the drum and each of the contact units is placed a pin which is held in contact with the surface of the drum by suitable means. The pins are slidably mounted in such a manner that, as the drum revolves, they move responsively to the surface irregularities on the keys, moving inwardly if these comprise recesses, and moving outwardly if they comprise projections. Whether moved inwardly or outwardly with respect to the drum, the pins actuate the contact units, either making or breaking contact depending upon the arrangement of the contact points comprising the contact unit. Each of the contact units is incorporated in one of the electric circuits which it is desired to control. Hence by setting the keys in the drum in a prearranged position with respect to the contact units, the latter may be operated alternately as the drum rotates.

A suitable driving mechanism is provided for rotating the drum. This comprises a motor actuated at intervals by means of a clock. The motor drives suitable power transmission means which, in turn, operates a mechanism for rotating the drum in stages corresponding to the spacing between the keys thereon.

Associated with the power transmission means is means for turning off the motor when the desired position of the drum has been reached, the motor remaining turned off until again set in motion when the clock has reached a given setting. In this manner, there are presented successively to the contact units each of the keys in the drum, which then actuate one of the contact units, the unit operated depending upon the position of the key on the drum. Any one of several electric circuits may be energized in this manner at predetermined time intervals and, when it is desired to tune a radio, the circuit may be employed to tune the radio to a selected one of several stations.

The setting of the keys on the drum is accomplished by means of a pair of arms which engage the opposite ends of the keys one at a time and move them to desired positions. The arms move in opposite directions to each other and are operated by an appropriately arranged system of levers. Abutting one of the levers there may be a variable position stop, the setting of which determines the final position of the two arms. Hence by setting the stop, it is possible to bring the arms to rest at any one of several final positions, and hence to set the key engaged by the arms in a corresponding position.

The construction and operation of our control device now will be described more specifically with reference to the drawings and the several embodiments illustrated therein.

1. THE SELECTING MECHANISM

As is shown particularly in Figures 1 to 5, the selecting mechanism is mounted in a suitable housing or framework 10. It comprises a drum 11 mounted rotatably in the frame by means of the shaft 12 journalled in openings in the frame. The drum preferably is hollow and open at its ends, there being provided on one end plate 13 bolted to the drum and having attached thereto the collar 14 provided with set screw 15. The latter attaches the drum rigidly to the shaft so that it turns with the latter. On the other end of the drum is the plate 16 which corresponds to plate 13 and is attached to the shaft through collar 17.

The drum 11 is made of any suitable constructional material such as brass. It has milled or otherwise formed in its surface a plurality of parallel grooves 20. These extend in a direction parallel to the axis of the drum and are spaced apart from each other by a suitable distance, depending upon how many intervals of time are to be controlled by the device. Where the latter is applied to the tuning of a radio, it is convenient to divide the day into 15-minute intervals, and there correspondingly are provided in the drum 96 spaced grooves, each one corresponding to a single fifteen-minute period.

The grooves in the drum serve the function of guideways for the keys 21 which are the elements primarily concerned in the selecting mechanism. Each key comprises an elongated member proportioned so that it slides freely within the groove in which it is contained and extends outwardly from the drum on one or both sides depending upon its position relative thereto. In the construction in which 96 grooves are provided in the drum, there will, of course, be 96 keys, one being placed in each of the grooves.

On the outer surface of each of the keys as it nests within its respective groove there are one or more irregularities which, in the embodiment illustrated, comprise recesses 22. These are adapted to cooperate with pins which, in turn, actuate contact units in a manner to be more fully described hereinafter. Hence the recesses are located on the key in positions such that a convenient longitudinal adjustment of the key will bring one of the recesses in registry with a selected one of the pins.

Means are provided for holding the keys 21 under a slight tension within the grooves in the drum. To this end there may be provided the flanges 24, 25 on the ends of the drum. In each flange there are a plurality of transverse grooves which register with the grooves on the body of the drum to form continuous channels in which the keys are received. There also are peripheral channels 26, 27, the bottom surfaces of which are at a plane somewhat below the plane of the upper surfaces of the keys as they seat in the grooves. Resilient members such as the springs 28, 29 then are placed within the peripheral channels in the flanges and adjusted to exert a slight pressure against the upper surfaces of the keys. In this manner, the latter are maintained within the grooves and prevented from moving laterally, without preventing their longitudinal movement. The resilient holding members serve the additional function of maintaining the keys in whatever position they may be set, thus keeping them in proper adjustment until it is desired to change their setting by moving them to a new position.

Means also are provided for moving the keys longitudinally of the drum and to set them in any one of several predetermined stations. In the embodiment illustrated, such means comprise a pair of arms 32, 33 which move in opposite directions and are adapted to engage the ends of the key opposite the follower pins and to move it to its new position. The desired selective movement is obtained by means of a system of lever arms associated with a variable position stop. Adjustment of the stop to any one of its several positions permits the movement of the lever arms in varying degree, thereby positioning the arms and the key engaged thereby in the selected station.

Figure 5:
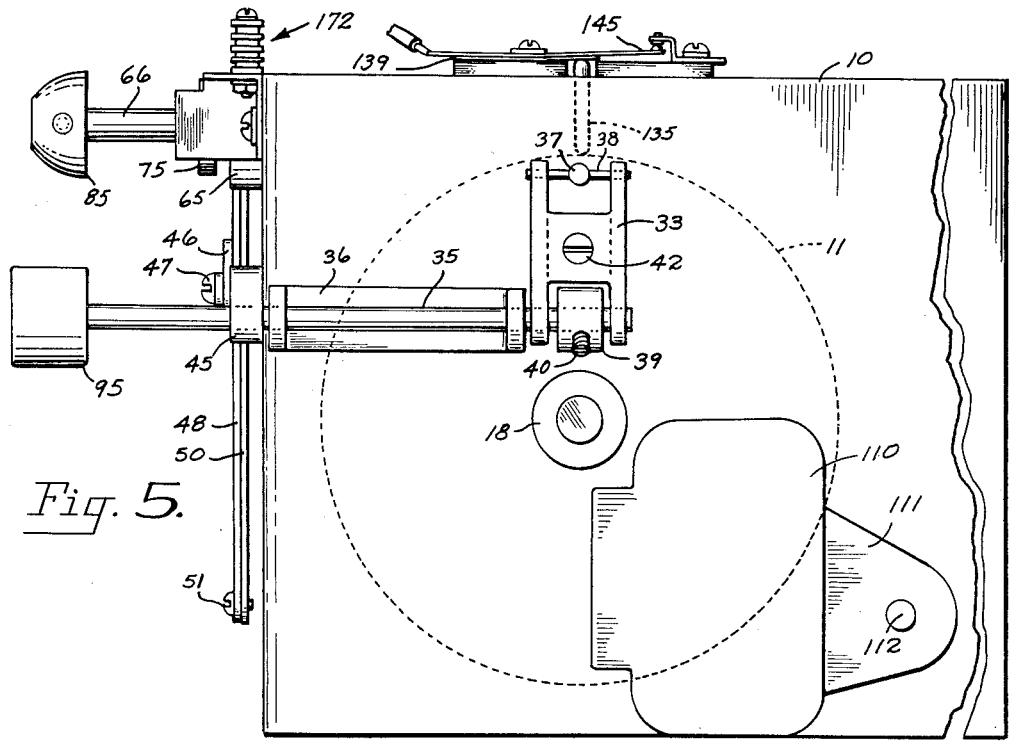
Figure 5 is a side view in elevation of the control device of our invention illustrating further the means employed for operating the selecting mechanism.
Figure 2:
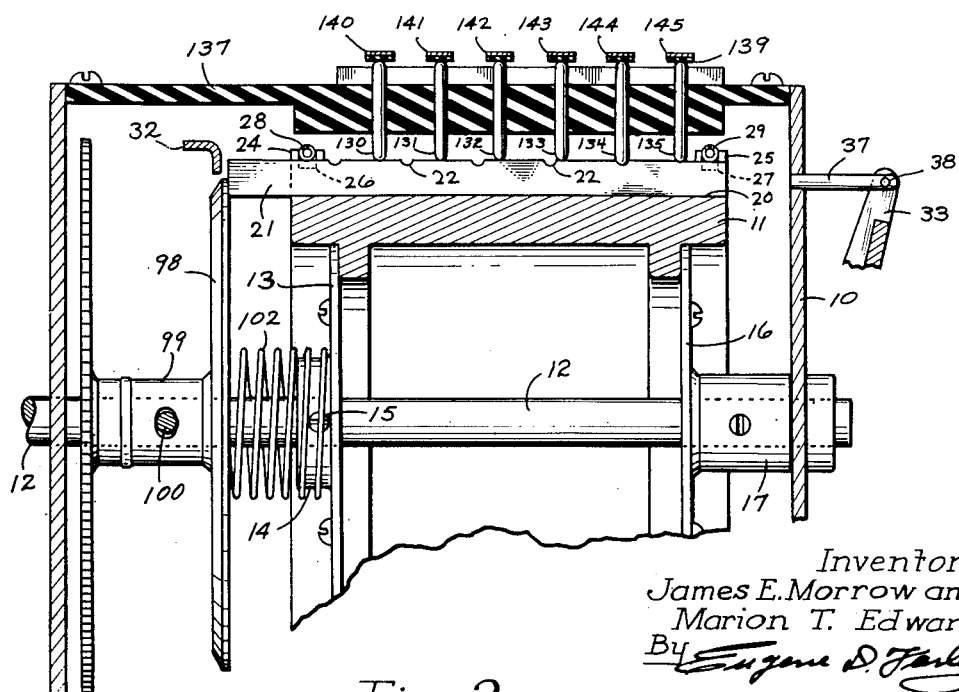
Figure 2 is a sectional view in elevation taken along the line 2—2 of Figure 1.

Thus as is shown particularly in Figures 1, 4 and 5, the lever system for setting the keys is operated through a shaft 35 journalled in a supporting bracket 36 attached to the side of the frame. The arm 33 is pivotally mounted on the end of the shaft and carries as an extension at its outer extremity the positioning pin 37 pivotally connected to the arm through the pin 38. The positioning pin 37 penetrates a perforation in the side of the frame, extending inwardly until it is just flush with the inner surface of the housing. It is the member making actual contact with the keys on the drum.

A collar 39 is rigidly attached to the shaft 35 by means of the set screw 40. The latter extends outwardly above the surface of the collar a sufficient distance to engage the arm 33 and hence to move the same and the positioning pin which it carries. The set screw 40 is spaced apart from the arm when the selecting mechanism is at rest so that a substantial rotation of the shaft 35 is permitted before the arm 33 is engaged by the set screw. This makes possible the adjustment of the position of the arm on the opposite side of the drum to various positions before the movement of the arm 33 is initiated.

To return the arm 33 to its normal position of rest after the setting operation, there is provided the spring 41 on the screw 42, the latter extending through a perforation in the arm and being threaded into the side of the frame.

The arm 32 also is actuated through movement of the shaft 35. Rigidly attached to the latter is a collar 45 on which pivotally is mounted the lever arm 46 through the screw 47. The lever arm 46 is attached pivotally to the lever arm 48 through the screw 49, and the lever arm 48, in turn, is attached pivotally to the lever arm 50 through the screw 51. The lever arm 50 is supported by the frame of the unit through the screw 52. In this manner, the lever arms 48 and 50 form a floating pivot which moves back and forth with the longitudinal movement of the lever arm 46.

The lever arm 48 is connected pivotally to a connecting link 54 through the screw 55, while the connecting link is attached to the terminal portion of the arm 32 through the screw 56. The arm 32 is pivotally mounted on the bracket 57 attached to the frame of the unit, the attachment being through the pin 58. This manner of mounting the arm 32 changes the direction of motion of the inner terminal portion thereof so that it moves in a direction opposite to the direction of motion of the pin 37 on the opposed arm 33.

Means also are provided for maintaining the above described lever system in a given position of rest and for returning it to this position after displacement therefrom by rotation of the shaft 35. Such means may comprise springs 60 and 61, the former interconnecting the arm 32 and the frame of the unit, and the latter connecting one of the lever arms, arm 46 for example, and the frame. These springs cooperate with the spring 41 which engages the arm 33 as hereinabove explained.

As indicated above, the degree of movement of the lever arm system is controlled by means of a variable position stop associated therewith (Figure 4). This element may comprise a member 65 of irregular outline attached rigidly and eccentrically to the shaft 66 which is mounted rotatably on the frame of the unit. In the embodiment illustrated, the variable position stop has a plurality of faces meeting each other at slight angles, these faces being indicated at 67, 68, 69, 70, 71 and 72. In addition, there is a lobe 73 at the position of farthest displacement from the shaft 66.

Rigidly attached to the same shaft as the variable position stop 65 is the ratchet 75 with which is associated a spring pawl 76. The notches on the ratchet are spaced in a manner to correspond with the numbered surfaces on the variable position stop and hence afford a means of presenting the latter in succession accurately to a given position.

A means of contact between the lever system and the variable position stop is afforded through the extension 77 on the lever arm 50. As the latter oscillates about the pin 52, the extension 77 will move toward and away from the variable position stop. The extent of its displacement will be determined by which face of the stop is most closely adjacent to it. This, in turn, will determine the final positions of the arms 32, 33.

Hence, to set the keys in the drum, the variable position stop 65 first is turned to a selected position. When the shaft 35 is rotated in a counterclockwise direction, the collars 39 and 45 will rotate therewith. During the first interval of rotation the collar 39 will move freely without contacting the arm 33. During this interval, however, the lever system comprising the lever arms 46, 48, and 50 and the connecting link 54 will actuate the arm 32, this being moved until the extension 77 on the lever arm 50 engages the surface of the variable position stop which is opposed to it. After a delay determined by the distance between the set screw 40 and the arm 33, the former will engage the latter and move it together with the pin 37 in a direction opposite the direction of motion of the arm 32. In this manner, the arms engage the ends of the key opposite them in the drum and slide it longitudinally in the groove in which it seats until it comes to rest in a position determined by the variable position stop. Thus by varying the position of the latter, the key may be caused to come to rest in any one of several selected locations or stations.

Associated with the drum and the selecting mechanism are means for rotating the drum in accordance with a predetermined time schedule. Such means in the embodiment illustrated comprise an indicator dial 80 which is securely affixed to the shaft 12 by means of collar 81 and which may be operated by means of the handle 82. The indicating dial preferably is a cylindrical member having on its periphery markings corresponding to the recesses or guideways in the drum. Where, as described hereinabove, the drum has in its surface 96 recesses, one for each fifteen-minute period during a twenty-four-hour day, the indicator dial may be marked off in hours and quarter hours, each marking corresponding to a given recess in the drum and the key which it contains. Thus by turning the indicating dial one marking at a time, setting the variable position stop and rotating the shaft 35 at each position of the indicating dial, the keys in the drum may all be set to conform to the desired schedule.

When the presently described device is applied to the control of a radio, the controls for the selecting mechanism described above may be arranged as indicated in Figure 3. Thus in a face panel 84, there may be the handle 85 with attached indicator point for manipulating the variable position stop 65, being affixed to the shaft 66 to which the stop also is affixed. Grouped around the handle 85 are the points 87 to 92, inclusive, these being spaced to correspond to the faces 72 to 67, inclusive, of the variable position stop. An appropriate legend may be placed near each one of the points 87 to 92, as to identify the radio station corresponding to that particular point.

In addition there may be present on the face panel the control handle 95 which is rigidly fastened to the shaft 35 and used to rotate the same. Still further, there may be present a clock 96 used in controlling the device, and various other controls the purposes of which will appear hereinafter.

2. THE CANCELLING MECHANISM

We also have provided means in the control device of our invention for returning the keys in the drum to positions where they turn off the responsive device, i. e. to cancel them, when this is desired. They may be cancelled individually, as when it is desired to cut out or eliminate a single radio program at a given time period without disturbing the rest of the schedule. Alternatively, all the keys may be cancelled simultaneously, thereby rendering the entire mechanism inactive, as when it is desired to set up an entirely different schedule.

To make possible the cancellation of a selected one of the keys without disturbing the others, there is provided on the variable position stop a surface 72 proportioned and spaced from the contact arm 77 in such a manner that the arms 32 and 33 will come to rest upon rotating the shaft 35 with the key which they engage in an inoperative position on the drum. In the embodiment illustrated particularly in Figure 2, this will be the position of maximum displacement toward the right. In this manner, it is easily possible to cancel any one or a number of selected keys by setting the handle 85 until the pointer thereon is at cancelling position 87, setting the indicator dial 80, and turning the handle 95 to actuate the arms 32, 33. This sequence may be repeated as often as necessary to cancel the desired keys.

To make possible cancelling all of the keys in a single operation, there is provided a contact member 98 preferably in the form of a disc having a diameter substantially equal to the diameter of the drum. The disc 98 is slidably mounted on the shaft 12 through the collar 99. A crank 100 is employed to move the cancelling disc on the shaft, the handle 101 secured to the crank being provided for this purpose. There also is provided a spring 102 encircling the shaft 12 and interposed between the drum and the cancelling disc.

It will be apparent that turning the crank 100 results in the displacement of the cancelling disc in the direction of the drum, this being accomplished against the tension of the spring 102. As the disc moves toward the drum, it engages the protruding ends of the keys thereon and slides them in their respective grooves toward the right as viewed in the drawings, until they have reached their inoperative positions. At the conclusion of the operation, the cancelling disc is returned to its original position and maintained there by the action of the spring 102. In this manner, all of the keys may be cancelled rapidly and a new schedule set up on the drum.

3. THE DRIVING MECHANISM

The mechanism whereby the control device of our invention is driven in accordance with a predetermined time schedule comprises a clock-controlled motor coupled through suitable power transmission means to means for driving the drum in stages. Switches also are provided for turning the motor on and off periodically.

Figure 7:
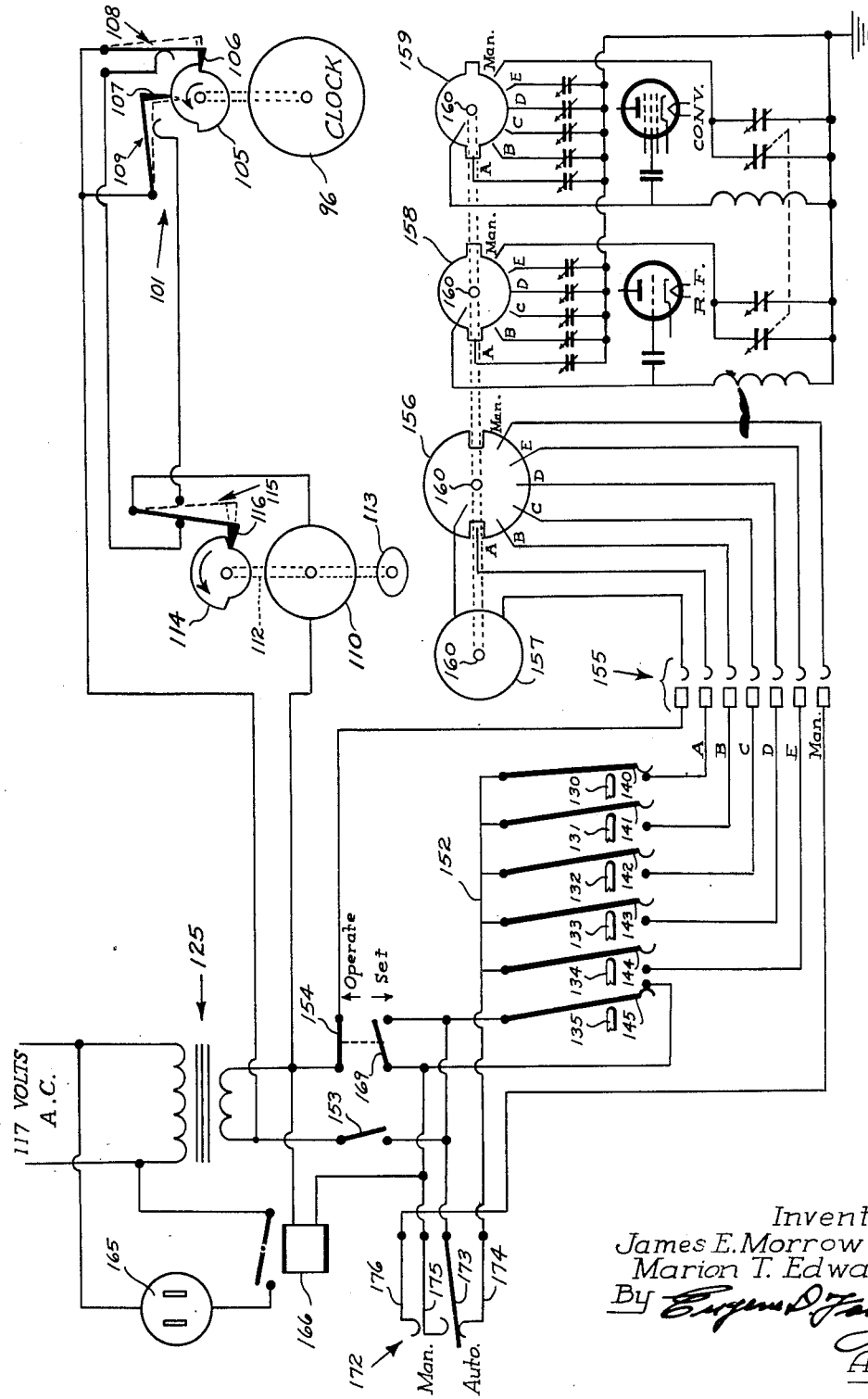
Figure 7 is a wiring diagram illustrating the electric circuit by means of which the control device of our invention is operated.

Thus as is apparent particularly from Figures 6 and 7, the clock 96 carries on its minute shaft the cam 105 which preferably is a two-lobe cam, the lobes of which are spaced at 180° from each other. There also are provided the cam followers 106 and 107, each of these forming one of the contact points of the electric contact units 108 and 109. The cam followers preferably are disposed at an angle of 90° to each other. Since the two-lobe cam 105 moves through 360° once each hour, it will be apparent that the cam followers will be activated by the lobes on the cam once each 15 minutes, thereby closing one or the other of the contact units at fifteen-minute time intervals.

In an electric circuit with the contact units 108 and 109 is an electric motor 110 which is connected through a suitable gear train indicated generally at 111 to the shaft 112. Rigidly affixed to the shaft is a cam, preferably a ratchet cam 113 and a single lobe cam 114. The latter is adapted to engage and actuate the two-way switch 115, operated by cam follower 116. Switch 115 also is in the electric circuit with the motor and is adapted to turn it off after a predetermined period of operation.

The ratchet cam 113 engages the pawl 117 which is pivotally mounted on the frame of the unit through the pin 118. The pawl, in turn, drives the notched wheel 120, one notch at a time. The wheel is rigidly affixed to the shaft 12 together with the drum 11 and therefore drives the latter. The number of notches on the wheel matches the number of grooves on the drum. Hence when the wheel is driven a distance equal to that between two adjacent notches, the drum is moved a distance equal to the space between two adjacent keys. After this movement has been completed, the motor 119 is shut off by means of the switch 115 actuated by the single lobe cam 114. In this manner it is possible to advance the drum in stages, at predetermined time intervals, and to hold it fixed at each stage, the stop 121 being provided for this purpose. The latter preferably is formed as an extension from the shank of the pawl and moves therewith in such a manner as to be disengaged from the notched wheel as the latter is driven by the pawl. This prevents the emanation of an undesirable clicking sound as the wheel moves from position to position.

4. THE ELECTRIC CIRCUIT

The electric circuit employed in the control device of our invention is illustrated in detail in Figure 7. It comprises essentially three separate circuits, i. e. that employed to operate the driving mechanism, that involving the selecting mechanism, and that involving the circuits in the responsive device, e. g. a radio.

In the first of these circuits, namely that employed to operate the driving mechanism, current coming from a central power source is passed through transformer 125 to reduce its voltage and then through the circuit comprising contact units 108, 109, the two-position switch 115, and the motor 119. When the two-lobe cam driven by the clock is in the position indicated, the contact unit 108 is closed, thus permitting current to flow through the two-way switch and through the motor, turning the latter on. The motor continues its operation until the single lobe cam 114 driven thereby has moved through 180°, thereby actuating the cam follower 116 and opening the two-way switch 115. This breaks the circuit and shuts off the motor.

After a sufficient time interval has passed so that the clock has turned cam 105 through 90°, the cam followers 106 and 107 assume the positions indicated in dotted outline. In this position, the contact unit 108 is broken while unit 109 is made. Since in this position the cam follower 116 also is in its dotted outline position, the circuit will be made through the double contact switch 115 and the motor energized. The latter will operate, driving the notched wheel 120 and drum 11 until the single lobe cam 114 has moved through another 180°, whereupon the circuit will be broken at the two-contact switch 115 and the motor turned off. This sequence is repeated at 15-minute intervals as long as the clock operates and the control device is connected to a source of electric energy.

Considering now the circuit of the selecting mechanism:

As indicated above, the drum 11 carries at spaced intervals on its periphery a plurality of elongated keys 21. Each of the keys has on its outer surface a plurality of spaced recesses 22. As the drum revolves, these recesses are adapted to register with follower pins 130 to 135, inclusive. These are slidably mounted in perforations through the support member 137 attached to the frame of the unit. They are positioned radially with respect to the drum and have rounded ends adapted to be in sliding engagement therewith as it rotates and to nest in any one of the recesses 22 when the latter are in registry therewith. The pins preferably are maintained in sliding contact with the drum under a slight spring tension.

Adjacent the follower pins and electrically insulated therefrom by strips 139 are a plurality of contact units 140 to 145, inclusive, one being positioned above each of the pins. Of these, contact units 140 to 144, inclusive, are normally open and are incorporated in the several circuits which it is desired to energize selectively. Contact 145 is normally closed for a reason which will appear hereinafter.

All of the contact units 140 to 145, inclusive, contain one contact point attached to a resilient member. In contact units 140 to 144, inclusive, the pin associated with each normally exerts a slight pressure against the tension of the resilient contact, thereby holding it open. In contact unit 145, on the other hand, the arrangement of the contact points is such that the pressure exerted by the pin associated therewith holds the contact unit closed against the tension of the resilient member. Therefore, when the follower pins associated with contact units 140 to 144 drop into the recesses in the keys, the pressure is released from the resilient contact member so that it approaches its fixed partner and makes contact therewith, thereby closing the circuit. In the case of contact unit 145, on the other hand, when the pin 135 associated therewith drops into a recess in a key, the release of pressure on the resilient contact point causes its separation from the other contact point of the unit with the result that the circuit is broken.

In the circuit, current is supplied to the line 152 from a transformer 125, when the on-off switch 153, automatic switch 174 and the operating switch 154 are closed. Then upon closing any one of contact units 140 to 144, as when the corresponding pin drops into a recess in a key on the drum, the corresponding one of lines A, B, C, D, or E is energized.

The current then travels through the energized line to the responsive unit, preferably through a connector 155. There it energizes a corresponding circuit. Where the responsive device is a radio, it thus may be tuned by incorporating in the radio a motor selector switch 156 which is affixed to a common shaft with a motor or solenoid 157, and a pair of multiple contact switches 158 and 159.

When electric current is introduced into the selector switch 156, this operates in its usual manner through the motor or solenoid 157 to rotate the common shaft 160 on which elements 156 to 159 are mounted until appropriate adjustment has been made, depending upon which of the lines entering the motor selector switch has been energized. This operates to direct the flow of current through corresponding tuning condensers and the radio is thereby tuned to the desired station.

Means also are incorporated in the circuit for turning the responsive device, e. g. the radio, on and off by remote control from the control unit. Thus there is included in the circuit a socket 165, which is adapted to connect the radio to the control device, and the relay 166. There also is included the setting switch 169. It will be apparent that, when the on-off switch 153 and the operating switch 154 are closed, the relay will be energized and the radio turned on. However, if either switch is opened, the radio will be turned off.

If it is desired to set the presently described control device during the operation of the radio without disturbing the reception of the program, the operating switch 154 may be opened and the set switch 169 closed. This breaks the circuit in the control unit so that the common lead 152 is deenergized. It makes the circuit through the relay, however, with the result that the radio circuit remains energized and continues to deliver the program of the station to which it is tuned. Then when the setting of the control device has been completed, as by moving certain of the keys to cancel position and setting certain of the others, the set switch 169 may be opened and the operating switch 154 closed. The radio then will deliver the program of the station to which it is tuned in accordance with the setting of the key opposite the follower pins. It will be tuned to other stations at various time intervals in accordance with the setting of the other keys on the drum. In the event that no station has been selected for any particular interval, the radio will be turned off through the operation of contact unit 145.

Means also are provided for cutting out the control device with the result that the radio or other responsive device may be operated manually. To this end there is incorporated in the circuit the triple contact flexible switch 172. When this is adjusted with the central lead 173 in contact with the contact point 174, current is conducted to the conductor 152 and the selecting mechanism is activated. However, when the contact unit 172 is adjusted to manual position (station 177 of Figure 3) with the central lead 173 out of contact with the contact 174 and in contact with the contacts 175 and 176, the line 152 will be dead, but the relay 166 will remain energized. Motor selector switch 156 also will be energized causing motor 157 to adjust the multiple contact switches 158 and 159 to their manual positions. Hence the radio will remain on and susceptible to manual-tuning.

5. ALTERNATE CONSTRUCTIONS (a) *Consolidated core*

Where it is desired to construct the control device of our invention in relatively small dimensions, as where it is desired to incorporate it in a radio cabinet, this may be accomplished by modifying the design in the manner illustrated in Figures 8 to 11, inclusive. In this modification, a short drum is employed and the follower pins are placed closely together. This makes possible the use of keys which are relatively short and have only one irregularity in the surface thereof, this being movable across the entire space occupied by all of the pins and in this manner cooperating with all of them in selecting the desired electric circuit.

In this embodiment, the drum 180, which may be made of metal, plastic, or other suitable constructional material as above described, has formed in its surface a plurality of parallel, spaced grooves 181, the spacing of the grooves being such as to provide one groove for each time interval to be controlled by the unit. Within each groove is slidably mounted a key 182 having a recess 183 in its exposed surface. The keys are maintained in the grooves and prevented from lateral displacement by means of springs 184, 185 or other resilient means contained in peripheral recesses in flanges 186, 187 at the ends of the drum. The tension of the springs is sufficient to exert a slight pressure on the keys, preventing their lateral displacement but permitting their longitudinal movement to adjust the position of the recess 183 with respect to the pins.

Stationed adjacent the drum is a support member 190. This member is made of insulating material and is provided with a plurality of closely spaced transverse perforations arranged in a line parallel to the axis of the drum. Disposed within the perforations radially with respect to the drum are a plurality of follower pins 191 to 196, inclusive. The ends of the follower pins adjacent the drum are rounded and are adapted to engage the surface of the drum as it rotates, and to nest within the recesses in the keys when the recesses are placed in alignment therewith.

The ends of the pins farthest removed from the drum preferably are notched to receive electric conducting wires or bars 201 to 206, inclusive. These are made of spring bronze, beryllium wire or other resilient electric conducting material and are fastened a spaced distance away from the support member 190 at one of their respective ends by suitable means, as by being embedded in a block 207 of insulating material fastened to the support member by means of the screws 208, 209.

The arrangement of the conducting elements 201 to 206 within the block 207 is such that they overlie the follower pins 191 to 196, being retained in the recesses therein. They are, however, electrically insulated from the pins, as by means of insulating sleeves 210. The distance between the conducting elements and the surface of the keys is such that the former are flexed a bit and hence are under a slight tension. Then when the follower pins drop down into a recess in the keys on the drum, the conducting elements move with the pins, this motion being used to make or break an electric circuit.

Attached to one end of each of the electric conductors 201 to 206 is an electric lead, these being indicated at 211 to 216, inclusive. At the other end of the conductors 201 to 206 is a transverse bar 217 of conducting material which is fastened to the support member 190 and connected to the other side of the line through conductor 218. There also is provided a finger 219 overlying the conducting arm 206 and in contact with the transverse bar 217. The circuit is completed through the finger 219 and bar 217 through the lead 220. In this manner, there are provided between the electric conductors 201 to 206, the bar 217 and the finger 219 a plurality of electric contact units corresponding to the contact units 140-145, inclusive, of the previously described embodiment (Figure 7). Of these, the contact units incorporating the conducting elements 201 to 205, inclusive, are normally open, while that formed between the conducting element 206 and the finger 219 is normally closed. Hence as the drum revolves and the follower pins drop into the recesses on the keys, a circuit is made between the conducting elements 201 to 205 and the bar 217 where the follower pins 191 to 195 are involved, and a circuit is broken when the follower pin 196 drops into a recess on the key. In the former situation, an electric circuit is energized which may be used to tune a radio, and in the latter situation the responsive device, e. g. the radio, is rendered inoperative pending a subsequent rotation of the drum and the presentation of another key to the following pins.

The adjustment of the keys in the drum of Figures 8 to 11 may be accomplished in the same manner as set forth in the previously described embodiment (Figure 4) by employing a pair of arms operated by a system of levers associated with a variable position stop. Their adjustment also may be effected, however, by the mechanism of Figure 9. As shown therein, the key 182 may be moved longitudinally in its groove in the drum by means of arms 225, 230 adapted to engage its ends and to set it in a predetermined position in the groove at which a selected one of the follower pins 191 to 196 will register with the recess in the key. The arm 225 is pivotally connected to the frame of the unit through the pin 226. It also is pivotally connected at its rear terminal portion to the lever arm 228 through the connecting link 229.

The other key engaging arm 230 is pivotally attached to the frame of the unit through the pin 231. It also is pivotally connected at its rear terminal portion to the connecting link 232 which, in turn, is pivotally attached to the lever arm 233. The latter is pivotally connected intermediate its ends to the lever arm 228 to which the key engaging arm 225 also is attached. Lever 228 is connected pivotally to the frame of the unit through the pin 234. Lever 233 is pivotally connected at one of its ends to a shaft 235. The latter is mounted for longitudinal movement on the frame of the unit by means of the pin 236 extending through the slot 237. Hence longitudinal movement of the shaft 235 will result in the movement of the key engaging arms 225 and 230 in opposite directions. Movement will take place against the tension of a spring 238 interconnecting the rear terminal portions of the arm, which therefore will return the latter to their spread apart positions after the release of pressure upon the shaft 235.

As in the case of the previously described embodiment, the final position of the arms 225 and 230 may be determined by means of a variable position stop 238 rotatably mounted on a shaft 239 and suitably positioned to abut against the arm 225, or one of the lever arms by means of which it is operated. As before, the variable position stop has a plurality of faces located at varying positions from the center of rotation of the stop. Where, as in the presently described case, there are six follower pins, there are provided six corresponding faces on the variable position stop, one for each of the pins.

In operating the key positioning mechanism of Figure 9, the variable position stop first is adjusted to a position corresponding to the pin which it is desired to activate. Then the shaft 235 is moved longitudinally to the left. By analyzing the operation of the lever system as indicated by the arrows and dotted outline of Figure 9, it will be apparent that the first effect of moving shaft 235 will be to displace the lever arm 228 to the left, and hence the forward end of arm 225 toward the right. This motion continues until the rear portion of arm 225 comes to rest against the variable position stop 238. Further displacement of the shaft 235 then will move the forward portion of arm 230 to the left. During such motion, it will engage the end of the key 182, pushing it to the left until it meets the end of arm 225. The key then will be in its adjusted position with the recess on the same directly opposite the selected follower pin. Upon rotation of the drum, the pin will drop into the recess on the key, thereby energizing the selected circuit and tuning the radio, or, in the event that pin is pin 206, associated with the normally closed contact unit, the effect will be to shut off the circuit and render the responsive device inoperative.

(b) Flexible core

Still another means of adapting the control unit of our invention to situations in which the available space is limited is illustrated in Figures 12 and 13. In this embodiment, the entire selecting mechanism is maintained at restricted vertical dimensions so that it may be placed above or below the mechanism which it is to control. Furthermore the core member is flexible, resembling an endless belt in its construction.

In the construction of this embodiment, the core member is comprised of a plurality of key carriers 245. These are elongated members having longitudinal recesses adapted to contain keys 246. The keys employed may have substantially the configurations and dimensions of the keys of the previously described embodiment and have in their outer surfaces a plurality of spaced recesses 247. Suitable means are provided for retaining the keys in the key carriers, this being accomplished, for example, by means of a friction fit between these two members. As before, the recesses in the key are adapted to receive the ends of follower pin 248 to 253, inclusive.

The key carriers are adapted to fit snugly against each other to present a substantially continuous surface to the exterior. They are linked together by means of extensions 254, 255 having perforations adapted to receive connecting pins. When connected together in this manner, there is formed a continuous belt or chain made up of a substantial number of the keys and having openings 256 between the connecting pins. These are adapted to receive sprockets 257 mounted on a shaft 258 which may be turned stepwise to advance the keys one at a time with respect to a station at which the pins 248 to 253, inclusive, are located. During this operation, the pins drop into the recesses energizing a selected circuit in the manner indicated above. In this manner, there is formed a selecting unit which is flat in configuration and suitable for insertion in a narrow space. Because of the flexible construction of the core member, however, it may be adapted for use in spaces of varying shapes.

(c) Conducting core

As still an alternate construction, there may be provided a core member or drum which, in addition to carrying the keys, forms an integral part of the electric circuit. Such a construction is illustrated in Figures 14 to 17, inclusive. In this case the drum 265 is made of brass or other electric conducting material. It may be of any suitable shape and dimensions, and has on its surface a plurality of spaced, parallel recesses extending in an axial direction and adapted to contain a plurality of keys 266, one key being in each recess. The keys are made of an insulating material and have in their outer surfaces spaced notches adapted to receive follower pins as described above. Such pins, 267 to 272, inclusive, are provided and made from a conducting material, as by being silver plated. They are fastened to resilient arms 275 to 280, inclusive, one being on the terminal portion of each arm. The resilient arms also are made of conducting material and to each is attached one of the electric conductors 282 to 287, inclusive.

The ends of the resilient arms 275 to 280, inclusive, opposite the follower pins 267 to 272 are fastened to a support member 299, the method of fastening being such that the follower pins are held against the drum under slight pressure of the resilient conductors. As the keys 266 seat in their respective grooves on the drum, the upper surfaces thereof are substantially flush with the outer surface of the drum. The lower surface of the recess in the keys is, however, somewhat below the outer surface of the drum. Therefore as the drum revolves stepwise to any one of its positions at which the keys are located directly opposite the pins, the latter will be held out of contact with the drum except when a recess on the key is in registry with the pin immediately opposite it. In this case, the pin will drop into the recess and, because of its shape, will come in contact with the drum at the edges of the grooves therein. This is shown particularly in Figure 15. When such contact is made, the circuit is made through one of the conductors 282 to 286, inclusive, through one of the connecting conductors 275 to 279, inclusive, through the pin attached to that particular conductor, through the body of the drum, and thence to the rest of the circuit.

The circuit of the embodiments of Figures 14 to 17, inclusive, is set forth in detail in Figure 17. As in the embodiment illustrated in Figure 7, current from a suitable power source passes through line 291 to socket 292 to which the radio may be connected. Also included in this circuit is the switch 293 operated by the solenoid 294, this arrangement making possible the turning of the radio on and off as required by the operation of the control unit.

To operate the latter, current from the power source reduced in voltage by the transformer 295 if necessary passes through on-off switch 298 (when closed), and through line 299 to the operate-set switch 300. Switch 298 corresponds to switch 153 in Figure 7 and has for its purpose the turning of the control device on and off. The operate-set switch 300 corresponds to switches 154 and 169 of Figure 7 and has for its purpose the adjustment of the control device to normal operating position when contact unit 301 is closed, and to setting position at which the keys on the drum may be set when contact unit 302 is closed.

When switch 300 is in operate position, current flows through line 303 to switch 305. The latter has for its purpose the breaking of the circuit through the selector mechanism during the brief interval when the drum is rotating to its successive positions and the follower pins are in contact with the ribs separating the grooves. This prevents the selector circuit from becoming energized at the times when all the follower pins are in contact with the conducting drum through the ribs thereon.

Switch 305 is operated by means of a projection 306 which engages the two-lobe cam 307. The latter, in turn, is rigidly affixed to a common shaft with the ratchet cam 308 which corresponds to ratchet cam 113 of Figure 7 and is used to drive the pawl by means of which the drum is rotated in stages. When the drum is at rest, the project 306 extends into one of the recesses formed between the two lobes of cam 307, being held there by the tension of one of the contact points in switch 305 or other suitable means. However, when the motor driving the drum is energized and turns the shaft to which ratchet cam 308 and two-lobe cam 307 are affixed, one of the lobes of the latter will displace projection 306 thereby opening switch 305 and de-energizing the selector circuit. After cam 307 has completed its stepwise rotation through 180°, projection 306 will drop into another recess therein, thereby closing switch 305 and re-energizing the electric circuit.

Current then passes through line 309 to selector drive motor 310 and the motor selector switch 311, both of these units being attached to a common shaft with radio selector switches (not shown) corresponding to switches 158 and 159 of Figure 7 and used to tune the radio.

Next the current passes to automatic-manual switch 312. The latter is a multiple contact switch having therein five contact units 315 to 319, inclusive, adapted to be closed when in automatic position, thereby energizing the circuits between the follower pins and the motor selector switch 311, and two contact units 320, 321 adapted to close the circuit employed during manual operation.

When switch 312 is in automatic position, the current will follow one of conductors 282 to 286, inclusive, and conducting follower pins 267 to 271, inclusive, depending upon which of the follower pins has been placed in contact with conducting drum 265, as by entering a recess in the key in the manner explained above. The circuit then is completed back to the other side of the transformer 295 by means of line 322.

When it is desired to set the selecting mechanism, operate-set switch 300 is adjusted to open contact unit 301 and close contact unit 302. This de-energizes the selector circuit but keeps closed the circuit through solenoid 294. The radio or other responsive device therefore remains energized during the setting operation. Thus the current passes from the transformer 295 through on-off switch 298, through line 324, through the solenoid 294, through line 325, through contact unit 302, and thence through line 326, 327, and 322 to the other side of the transformer.

When it is desired to operate the radio or other responsive device manually, the multiple contact switch 312 is set in manual position, thereby opening contact units 315 to 319, inclusive, and closing contact units 320, 321. In this position of switch 312, current leaving the transformer 295 passes through on-off switch 298, line 299, contact unit 301, line 303 and switch 305, thence through line 309, and selector drive motor and switch 310 and 311, respectively, and then back to the other side of the transformer through line 329, contact unit 321, and lines 327 and 322. At the same time, current passes through a second circuit comprising switch 298, line 324, solenoid 294, line 325, contact unit 320, and lines 327 and 322, thereby maintaining the radio circuit energized.

When it is desired to turn the radio off for a given time interval, the key corresponding to that interval is set so that pin 272 will drop into a recess on the key. This will open contact unit 328, breaking the circuit through solenoid 294 and shutting off the radio. The latter then will remain turned off until the drum turns again, presenting another key to the follower pin which closes contact unit 328.

Although in all of the above described embodiments the surface irregularities have been illustrated as depressions adapted to receive the ends of the follower pins, it will be apparent that they also may comprise surface irregularities of other forms, such as, for example, elevations. Thus as is illustrated in Figure 18, a key 340 may have on its surface one or more projections 341. Associated with the key are a plurality of follower pins 342 adapted to be held against the key under a slight tension. When a projection on a key is aligned with one of the pins, it will elevate it as the drum rotates, and this motion may be used to operate a cooperating switch placed above the follower pin, either breaking or making a circuit to operate the circuit selecting mechanism as set forth above.

6. OPERATION

The operation of all of the above described embodiments of our invention is fundamentally similar. First the desired schedule is set up on the core or body member. This is accomplished by setting the indicating dial at a given time period. Next the control handle 85 is turned to the desired station. Next the arm setting handle 95 is turned, thus adjusting the arms and moving the key corresponding to that particular time until a recess therein is opposite the follower pin controlling the switch which will energize the appropriate circuit. Next the indicator dial is turned to the subsequent time interval and the above procedure followed, setting the setting dial at any desired station. This sequence is repeated until all of the keys, or as many as are desired, have been set.

The indicator dial, and the drum attached thereto, then are returned to their original position which should correspond to the time shown by the clock 96. As the latter runs, its hour shaft will turn the two-lobe cam 105 which, at fifteen-minute intervals, will energize the circuit including the motor 110. The latter will run for a time interval determined by the single lobe cam 114 and, while running, will advance both the indicator dial and the drum to the next time period. In so doing, it will present another key to the group of follower pins, one of which may drop into a recess in the key and thus close another circuit and tune in a corresponding station. If none of the recesses on the key registers with the pins, i. e. when the key is in a position such as to break the contact at the cancel unit 145, the radio will be shut off and will remain shut off until it is turned on again by a subsequent stepwise rotation of the drum.

When it is desired to make a new setting for a given time interval without disturbing the operation of the radio, the operating switch 154 is disconnected and set switch 169 connected. This may be done in a single operation since both switch 154 and switch 169 may be tied together and operated by a single control. The indicating dial then is turned to the desired time interval, the station selecting knob turned to the appropriate station, and the setting handle 95 turned to adjust the key. The indicating dial then is turned back to its original position, the set switch opened, and the operating switch closed. Then as the drum continues its rotation, the operation of the unit will be governed by the new setting made.

When it is desired to cancel all of the settings on the drum in order to set up an entire day's radio program, the operating switch is opened and the set switch closed as indicated above. Then the cancelling lever 101 is actuated, this moving the disc 98 which shifts all of the keys to the cancel position in which none of the circuits will be energized upon rotation of the drum and the radio circuit will be broken. Then each of the individual keys, or as many as desired, may be set up on the drum in the manner indicated above.

When it is desired to dispense altogether with the selecting mechanism and to operate the radio manually, this may be done by moving the set handle 85 to the manual position. This has the effect of shifting the position of the variable position stop 65 until the projection on the end thereof engages the multiple contact switch 172 in such a manner as to energize the manual position of the motor selector switch 156 which will actuate motor 157 correspondingly and set the multiple contact switches 158 and 159 on their manual positions. When thus set, the radio may be operated manually until the selecting mechanism again is cut in in the manner outlined above.

Thus it will be apparent that by means of our invention we are able to select and actuate any one of a plurality of electric circuits at predetermined time intervals. We also are able to control the operation of a radio automatically so that preselected programs may be turned in at selected intervals during the 24-hour day and, if desired, repeated automatically from day to day. Our selecting mechanism may be set rapidly and easily to follow the desired schedule, and may be changed from time to time without disturbing the operation of the device. Any one or all of the selected settings may easily be cancelled. Furthermore, all of the various advantages are obtained by means of a control device which is simple in construction and operation and which may be applied either in the construction of new radio units or adapted for application to radio units already in use.

Having now described our invention in preferred embodiments, we claim as new and desire to protect by Letters Patent:

1. A device for automatically tuning a radio in accordance with a preselected schedule, said device comprising a rotatably mounted drum having in the surface thereof a plurality of guideways aligned with the axis of the drum, a plurality of keys slidably mounted one within each of the guideways, each key having a surface area of irregular configuration as it nests within the guideway in the drum, a pair of arms adapted to engage the ends of the keys, lever means for actuating the arms in opposite directions, a variable position stop associated with the lever means for arresting the motion of the arms at predetermined positions, thereby setting the keys at corresponding positions in the drum, a plurality of electric contacts positioned adjacent the drum, a plurality of pins arranged between the electric contacts and the drum and adapted to be actuated by the surface irregularities on the keys, thereby making and breaking an electric circuit through the contacts, and means associated with the contacts for moving the drum in stages according to the preselected schedule, thereby tuning the radio.

2. In a device for automatically tuning a radio by energizing a selected one of a plurality of electric circuits, the combination comprising a plurality of contact units, one being included in each of the circuits to be energized, a rotatable drum, a plurality of keys slidably mounted at spaced intervals on the periphery of the drum and having irregularities on the surface thereof, and setting means for adjusting the keys on the drum in a position calculated to close a selected one of the contact units, the setting means comprising a pair of arms adapted to engage the ends of the keys from opposite directions, lever means for actuating the arms, and a variable position stop associated with the lever means and adapted to arrest the motion of the arms at the selected position.

3. A control device for controlling the operation of a responsive device in accordance with a preselected time schedule, said control device comprising a body member, a plurality of keys mounted for longitudinal movement on the body member, the keys having surface areas of irregular configuration, a pair of arms adapted to engage the ends of the individual keys, lever means for moving the arms in opposite directions, stop means for arresting the motion of the lever arms in a predetermined position, thereby stationing the engaged key at a corresponding position, electric contact means adapted to be actuated by the surface irregularities on the keys and to actuate in turn the responsive device, and motor means for moving the body member according to the preselected time schedule, thereby changing the relative positions of the contact means and the keys and changing correspondingly the setting of the said responsive device.

4. A control device for controlling the operation of a responsive device in accordance with a preselected time schedule, said control device comprising a body member, a plurality of keys mounted for longitudinal movement on the body member, the keys having surface areas of irregular configuration, a pair of arms adapted to engage the ends of the keys one key at a time, lever means for moving the arms in opposite directions, a variable position stop adjacent the lever means for arresting the motion of the same in a selected one of a plurality of predetermined positions, thereby stationing the engaged key in a corresponding position, electric contact means adapted to be actuated by the surface irregularities on the keys and to actuate in turn the responsive device, and motor means for moving the body member according to the preselected time schedule, thereby changing the relative positions of the contact means and the keys and changing correspondingly the setting of the said responsive device.

5. The control device of claim 4 wherein the variable position stop comprises a member having a plurality of faces, said member being eccentrically mounted on a rotatable shaft whereby to place a selected one of the faces in stop relationship to the lever means.

6. A control device for controlling the operation of responsive electrical apparatus in accordance with a preselected time schedule, said control device comprising a body member, a plurality of keys slidably mounted longitudinally on the body member, the keys having surface areas of irregular configuration, electric contact means adapted to be actuated by the surface irregularities on the keys and to actuate in turn the responsive apparatus, means for moving the body member according to the preselected time schedule thereby changing the relative positions of the contact means and the keys and changing correspondingly the setting of the responsive apparatus, and adjusting means for adjusting the position of the keys on the body member, said adjusting means comprising a rotatably mounted control shaft, a first arm for contacting one end of a selected key, first lever means interconnecting the control shaft and the first arm for moving the same toward and away from the key, a second arm adapted to contact the other end of the key, second lever means interconnecting the control shaft and the second arm for moving the same toward and away from the key, and a variable position stop adjacent the first lever means, rotation of the control shaft effecting contact of the first lever means with the variable position stop thereby arresting the motion of the first arm, and continued rotation of the control shaft affecting the longitudinal displacement of the key by the second arm until it abuts the first arm, thereby stationing the key in a selected station relative to the electric contact means.

7. A control device for controlling the operation of a responsive device in accordance with a preselected schedule, said control device comprising a body member, a plurality of keys having thereon a surface irregularity, said keys being mounted for longitudinal movement on the body member, means for adjusting the position of the keys on the body member, a plurality of electric contacts spaced apart from the body member, a plurality of pins disposed one between each of the contact members and the body member, the pins being displaceable by the surface irregularities on the keys, thereby operating the switches with which they are associated and actuating the responsive device, and means for moving the body member in accordance with the preselected time schedule, thereby changing the relative positions of the contact means and the keys and changing correspondingly the setting of the responsive device.

JAMES E. MORROW.
MARION T. EDWARDS.

REFERENCES CITED

The following references are of record in the file of this patent:

UNITED STATES PATENTS

| Number | Name | Date |
|---|---|---|
| 1,964,909 | Garity | July 3, 1934 |
| 2,010,044 | Temple | Aug. 6, 1935 |
| 2,045,251 | Raber | June 23, 1936 |
| 2,096,072 | Spagnola | Oct. 19, 1937 |
| 2,130,164 | Verkins | Sept. 13, 1938 |
| 2,155,304 | Corey | Apr. 18, 1939 |
| 2,217,342 | Ladrach | Oct. 8, 1940 |
| 2,252,154 | Baak et al. | Aug. 12, 1941 |
| 2,504,589 | Rohrer | Apr. 18, 1950 |